United States Patent [19]

Smith et al.

[11] 4,316,219
[45] Feb. 16, 1982

[54] SYNCHRONIZING CIRCUIT ADAPTABLE FOR VARIOUS TV STANDARDS

[75] Inventors: Terrence R. Smith, Mapleshade; Frank J. Marlowe, Kingston, both of N.J.

[73] Assignee: RCA Corporation, New York, N.Y.

[21] Appl. No.: 169,680

[22] Filed: Jul. 17, 1980

[51] Int. Cl.³ .............................................. H04N 5/06
[52] U.S. Cl. .................................................. 358/150
[58] Field of Search .................. 358/11, 141, 148, 150

[56] References Cited

U.S. PATENT DOCUMENTS

| | | | |
|---|---|---|---|
| 4,007,486 | 2/1977 | Inaba et al. | 358/13 |
| 4,169,659 | 10/1979 | Marlowe | 358/150 |
| 4,246,609 | 1/1981 | Van Der Valk | 358/140 |

*Primary Examiner*—Robert L. Richardson
*Attorney, Agent, or Firm*—Paul J. Rasmussen; William H. Meise; Henry I. Steckler

[57] ABSTRACT

A sync generator uses ROMs addressed by counters to synthesize various television sync waveforms. The ROMs can be changed or reprogrammed to generate sync signals for different standards. By dividing the sync signals into four intervals which are selected by paging signals from one counter, a reduction in required ROM capacity is achieved.

12 Claims, 5 Drawing Figures

SYNCHRONIZING CIRCUIT ADAPTABLE FOR VARIOUS TV STANDARDS

BACKGROUND OF THE INVENTION

This invention relates to synchronizing arrangements for generating synchronizing and blanking signals, which arrangement is readily adaptable for various television standards.

There are four main television standards in use throughout the world; NTSC, SECAM, PAL and PAL-M. Making receivers for each one of these various standards poses no problem, since there is sufficient manufacturing volume to economically justify this specialization.

Studio apparatus using sync generators, such as for example cameras, is however, a different situation. It is difficult to justify making a sync generator for just one standard due to the low volume involved. One solution is shown in U.S. Pat. No. 4,169,659, which shows a sync generator that is adaptable to different standards. However, a cost penalty is then incurred on every unit because each unit must include portions applicable only to other standards, even though they may never be used. Further, once built, the adaptable unit cannot be readily changed to produce different pulses as may be required, e.g., a pulse occurring at the 19th horizontal line to control insertion of a vertical interval test signal when the unit was designed to produce a pulse on the 21st horizontal line. Another problem is that the circuit cannot be changed without complete redesign of hardware to generate a new standard as this may become necessary. For example, one standard that is sometimes used has 24 frames per second to match that of film, and 655 lines per frame, which standard has the same bandwidth as that of NTSC.

It is therefore desirable to have a sync generator that is readily adaptable in the field among both present and future standards. It is also desirable that there be only a small cost penalty for this adaptability, which then is offset by the larger volume of manufacture of the adaptable circuit.

SUMMARY OF THE INVENTION

A television synchronizing signal generator comprising a memory for storing information relating to the magnitude of at least one component of a composite synchronizing signal at each of a predetermined plurality of sampling points or times in each television frame; and a clock signal generator coupled to the memory for generating periodic sampling signals for recurrently addressing the memory for reading the information from the memory for generating the component signal.

DETAILED DESCRIPTION

Figure 1:
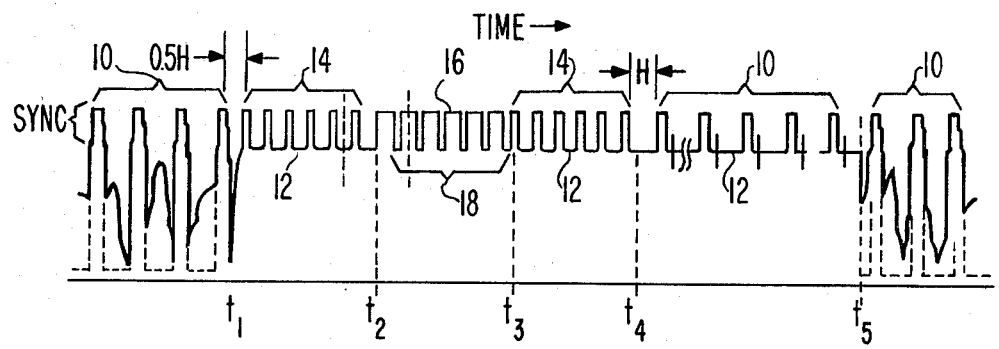
FIG. 1 is a drawing of an NTSC composite video signal around the vertical blanking interval.

FIG. 1 illustrates an NTSC composite video signal in the region about the vertical blanking interval of one television field. Positive-going pulses 10 are the horizontal synchronizing signals occurring before time t1 near the bottom of the raster. During the next time interval t1-t2, the composite signal comprises the superposition of the vertical blanking pulse 12 and six equalizing pulses 14. In the next interval t2-t3, the composite signal comprises the superposition of the vertical blanking signal 12 and a vertical sync signal 16 serrated by negative-going equalizing pulses 18. During the next interval t3-t4, the composite signal comprises the vertical blanking signal 12 summed with further equalizing pulses 14. The composite signal in interval t3-t4 is identical to that in the interval t1-t2. The composite signal during the next following interval t4-t5 comprises the sum of the vertical blanking signal 12 and horizontal sync pulses 10. Interval t4-t5 has a duration established by the number of horizontal lines selected in accordance with the desired application within the television synchronizing standard being used. In the time following time t5 and extending until the next following time t1 of the beginning of the next following blanking signal, the composite signal is as described above for the time preceding time t1.

The composite sync for the second NTSC field is identical except for certain half-line time shifts.

Figure 2:
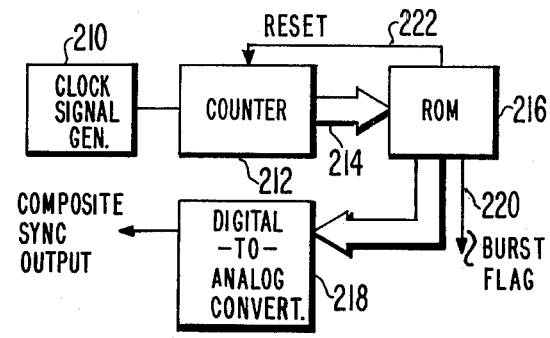
FIG. 2 is a block diagram of an embodiment of the invention.

FIG. 2 illustrates in simplified block diagram form a television composite synchronizing and blanking signal generator according to the invention. In FIG. 2, is shown a clock signal generator 210. A counter 212 is coupled to generator 210 for counting clock pulses and provides a decoded output signal on parallel output lines illustrated as a broad arrow 214. The decoded signal uniquely represents each state of the counter 212 as it counts clock pulses. A digital read-only memory (ROM) 216 is addressed by the signals on lines 214. Thus, each unique state of counter 212 addresses a single memory location in ROM 216. Each memory location of ROM 216 has sufficient bit storage capacity for the number of levels required to synthesize the instantaneous amplitude of the desired waveform. With 8 bits, a signal having 256 levels can be synthesized. To synthesize the waveform of FIG. 1, three levels are required; white, blanking and sync levels, which requires a storage capacity of 2 bits. The two bits representing the three levels are sequentially provided by ROM 216 to a D-to-A converter 218 to generate at the clock rate the desired 3-level analog output signals.

In the event that the sync standard being used requires a count of clock pulses less than the maximum count of which counter 212 is capable, the counter may be reset at the proper count (representing the number of clock pulses in one field or one frame, as required). The reset is accomplished by a pulse generated by ROM 216 and applied over a conductor or line 222 to counter 212. It should be noted that the reset information requires another one-bit section of memory in ROM 212; consequently, the data path of ROM 212 must be a minimum of 3 bits in width.

Other synchronization and control signals can be provided by ROM 216. For example, output 220 can provide a burst flag. In this case, each ROM memory location must have a storage capacity of four bits, two of which are used as described to generate the composite sync and blanking signal, and one of which resets the counter as described above, and a further one of which is used to control the instantaneous value which the burst flag is to have. In a similar manner, other control signals such as horizontal and vertical drive can be provided by providing sufficient memory capacity.

The above-described arrangement carries the information to generate television sync and blanking signals for any desired standard in the form of the programming of various memory locations. Change from one standard to another within a particular piece of equipment can be accomplished by changing the program ROM 216, or alternately by replacing the ROM with one appropriately programmed. Reprogramming of ROM (PROM) such as one which can be erased by ultraviolet light (EPROM) by first erasing the unwanted current program, and using an appropriate programmer for imposing the desired program on the memory. Replacing ROM 216 can be easily accomplished if it is mounted in an integrated circuit socket.

The memory capacity required for the above-described arrangement is large. The memory requirements can be reduced by exploiting the cyclically redundant nature of the components making up the composite sync and blanking signals.

It will be noted that in FIG. 1 the signal in the interval between times t1 and t2 is of the same shape and has the same amplitude (on a line-to-line basis) as the signal between times t3 and t4. Consequently, the signal can be generated by recurrently addressing the same ROM memory addresses. These intervals form what is hereafter called a type 1 interval. Next is the interval between times t2 and t3 which is hereafter called a type 2 interval. The sync and blanking signals during the type 2 interval are generated by addressing another portion of the ROM. The signals present during the interval between times t4 and t5 are different in amplitude and shape than those in the aforementioned intervals. The interval t4-t5 is a type 3 interval, and the sync and blanking signals produce during a type 3 interval are generated by addressing still another portion of the ROM. The last type of interval is a type 0 interval, which occurs before time t1 and after time t5, and corresponds to the main portion of the television signal during which active video is present. Yet another portion of the ROM is used to store the information relating to the amplitudes of the sync and blanking components of the composite sync signal during type 0 intervals.

Figure 3:
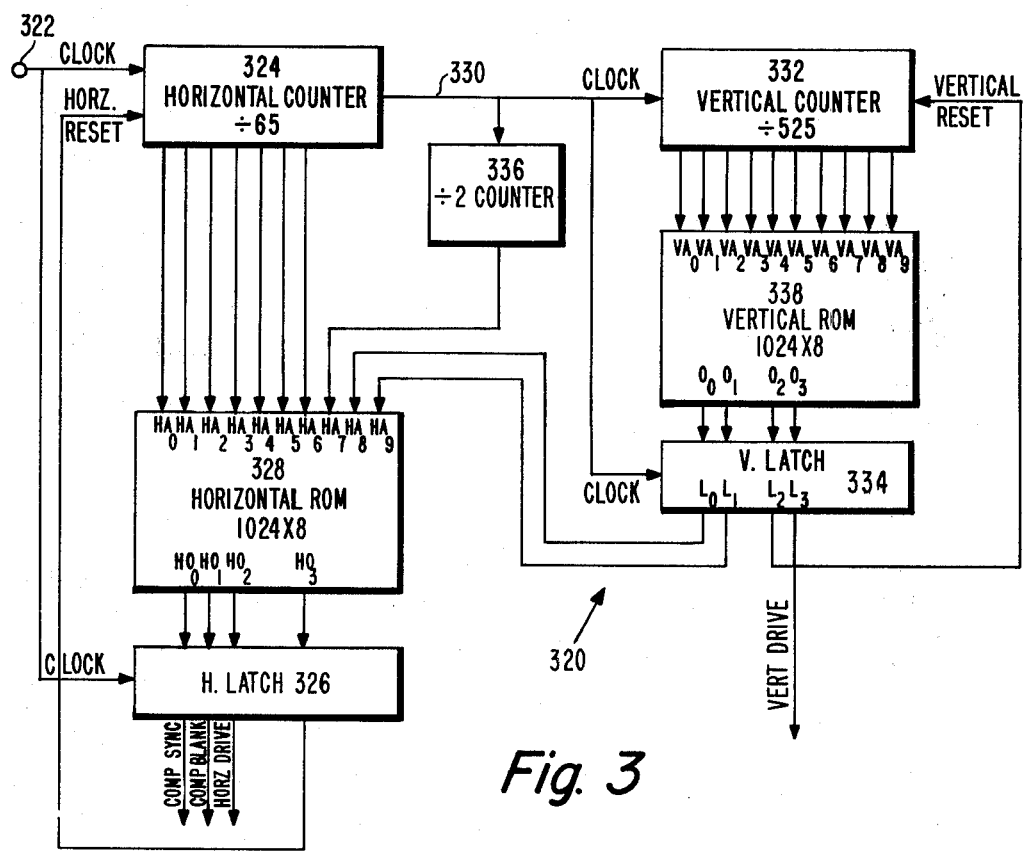
FIG. 3 is a detailed block diagram of another embodiment of the invention.

FIG. 3 illustrates in block diagram form a sync generator arrangement having reduced memory as compared with the arrangement of FIG. 2. The arrangement of FIG. 3, designated generally as 320, accepts clock pulses at an input terminal 322 from a source (not shown) and generates at various output terminals those synchronizing and blanking signals from which a composite blanking signal is formed. The clock pulses are illustrated as 501 of FIG. 5. Since sync generator 320 may operate with equipment which processes color television signals in a sampled manner, it is desirable to use a clock signal frequency which is related to the color subcarrier frequency. Often, the clock signal is at four times the subcarrier frequency (4×SC). However, inexpensive present logic circuits cannot operate dependably at this frequency, so in the embodiment shown the clock signal is at a frequency of one-seventh of 4×SC. [Other clock frequencies such as one-fifth of 4×SC may be used.] Clock signal 501 is applied to both a horizontal counter 324 and to a horizontal latch circuit 326 as illustrated in FIG. 3.

Horizontal counter 324 is a synchronous seven-bit binary counter, each of the cells or stages of which is coupled by an address line to a corresponding portion of a horizontal ROM 328. Horizontal counter 324 also produces on an output conductor 330 a signal illustrated as 410 of FIG. 4 having twice the horizontal frequency. This twice-horizontal-frequency signal is produced by dividing the frequency of clock signal 501 by an appropriate factor. Counter 324 is capable of a maximum count of 128, but is reset by a signal from an appropriate memory location in ROM 328 (by way of latch 326) at the appropriate count. For a particular embodiment of the sync generator for producing a standard NTSC sync signal, the clock frequency of clock signal 501 is 2.04545 MHz and the corresponding count of counter 324 is 65.

The twice horizontal frequency signal produced on conductor 330 by dividing 2.04545 MHz by the divisor 65 is applied to a vertical counter 332, to a divide-by 2 counter 336, and to a latch circuit 334. The counter 332 has a unique state during each half-line of a field. Vertical ROM 338 decodes the unique state of the counter 332 and for each state produces an output (outputs) from the corresponding memory location. ROM 338 must have a bit width or memory capacity at each location commensurate to the application. As in the arrangement of FIG. 2, one memory bit per location or address is used to generate the counter reset pulse. The reset pulse is generated when the appropriate count of counter 332 addresses the memory location of ROM 338 containing a logic 1 (for the positive-logic case), rather than the logic 0 occurring at all other prior addresses. The reset pulse is coupled from ROM 338 at output terminal 02. Other output signals of ROM 338 are the vertical drive signal, which appears at output terminal 03, and horizontal page selection signals which appear at output terminals 00 and 01 of ROM 338.

Figure 4:
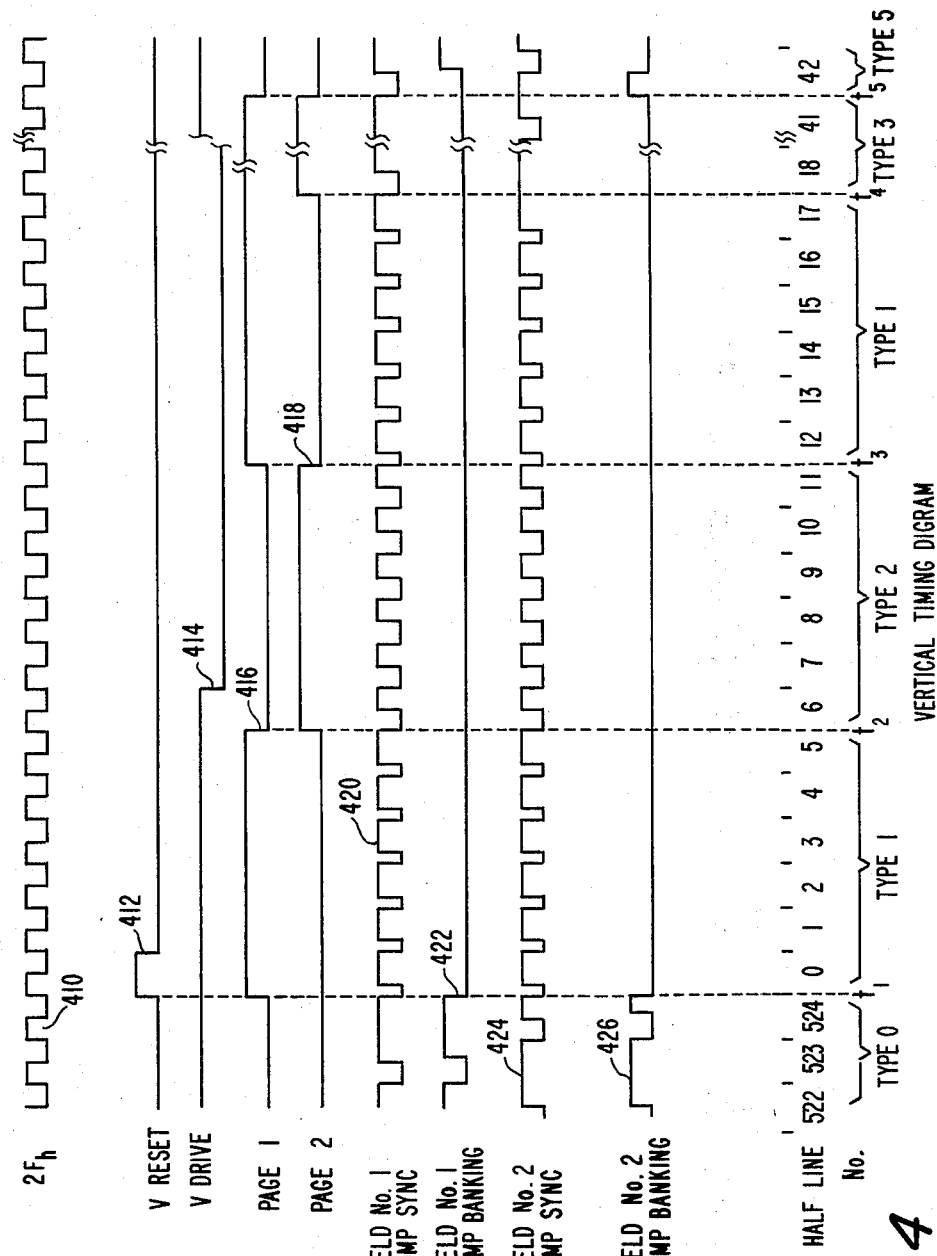
FIG. 4 is a timing diagram of vertical rate signals present in FIG. 3.

These various output signals of ROM 338 are applied to corresponding input terminals of a vertical latch circuit 334. Latch 334 acts to reclock the signals in accordance with half-line signal 410. This reclocking accommodates internal delays of counter 332 and ROM 338. In effect, the latch output signal corresponds to the ROM output signal for the preceding half-line. Vertical reset pulse 412, vertical drive pulse 414, and the horizontal page selector signals 416 and 418 as illustrated in FIG. 4 are generated at output terminals L2, L3, L0 and L1 respectively, of latch 334.

Each of the cells or stages of counter 332 is coupled by one of ten address lines (VA0-VA9) to a corresponding portion of vertical ROM 338. ROM 338 decodes the addresses represented by each unique state of counter 332 as it counts the twice-horizontal frequency signal applied to the counter input. Ten-stage counter 332 is capable of a maximum count of 1024, but is reset as described by the appropriately programmed ROM according to the required standard being generated. In this particular embodiment for producing standard NTSC frame of 525 lines, counter 332 counts 525 twice-horizontal frequency pulses 410 (which have a duration of one-half horizontal line) during each field. For other standards, as for example the aforementioned 655-line standard for film compatibility, or for 625-line PAL or SECAM, counter 332 is reset during the appropriate count.

In a similar manner, counter 332 addresses ROM 338 to provide the vertical drive signal to latch 334. Latch 334 reclocks this drive signal to provide at output L3 the seven full lines duration vertical drive signal 414. Negative-going signal 414 begins between half line intervals 6 and 7 as illustrated in FIG. 4 and ends between half line intervals 20 and 21 (not shown) for NTSC. Since this signal 414 changes at one-half line intervals, no information from horizontal ROM 328 is required to generate it. Consequently, vertical drive signal 414 can be derived exclusively from vertical ROM 338. This is true in the case of all the above-mentioned standards, the only difference being the occurrence of the leading and trailing edges with respect to the zero labelled half line. The width in all of these standards is the same seven full lines at NTSC.

The page signals 416 and 418 at outputs L0 and L1, respectively, are used to identify which one of the types of intervals is currently being counted or generated, and this information is applied to horizontal ROM 328 at inputs HA8 and HA9 respectively. In particular, during the type 0 intervals both page signals are low. During type 1 intervals page signal 416 is high, while page signal 418 is low. In the type 2 intervals, page signal 416 is low, and page signal 418 is high. Type 3 intervals have the both signals 416 and 418 high. If it is desired to provide other signals, e.g., color bar gating signals or white balance cursor, then it is necessary to provide more page address lines from latch 334 to ROM 328, thus dividing each field into more intervals. However, for every new page address line, the size of ROM 328 must be doubled.

A problem is encountered due to the interlace structure of the NTSC frame, which requires a one-half line offset of the composite sync and blanking signals between successive fields. This is shown by signals 420 and 422 of FIG. 4 for field one as compared to signals 424 and 426 for field two. Since the counters are based on half scan line intervals, we can provide for interlace by a free running counter (one that never gets reset) such as counter 336 operating at the line frequency. This free running clock 336 is 180° out-of-phase during the same vertical count in each of two successive fields due to the odd number of half lines per field. Using the output signal 502 shown in FIG. 5 of clock 336 as address signal for address line HA7 for ROM 328 permits identification of which half of the selected "type of line" it is desired to be read out of memory for that one-half line interval. The two different half line intervals determined by counter 336, when taken in combination with the four types of intervals (type 0-type 3) determined by the page signals, result in a total of eight half line intervals. These eight unique half-line intervals are stored in eight corresponding pages on portions of horizontal ROM 328.

The final address lines that remain are those that originate from the horizontal counter 324. These seven address lines HA0-HA6 sequentially access the memory locations of horizontal ROM 328 and read out the stored amplitude of the timing signals from the pages of ROM memory addressed by the page signals in the time interval chosen by the master clock applied to input 322.

Figure 5:
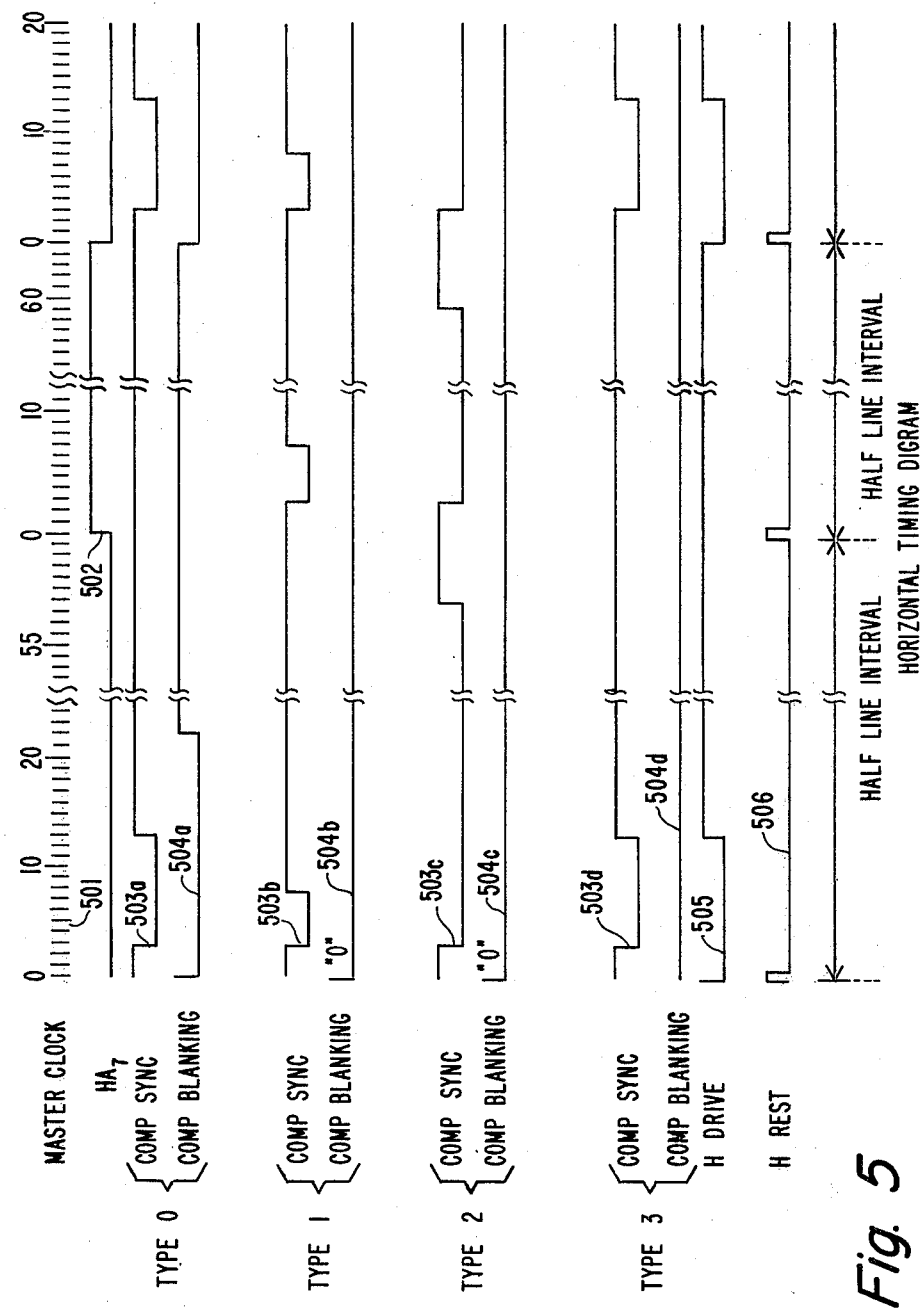
FIG. 5 is a timing diagram of horizontal rate signals present in FIG. 3.

These timing signals are shown in FIG. 5 for all eight half-line intervals. In particular, they are composite sync signals 503a, 503b, 503c, and 503d during intervals type 0 to type 3 respectively, which are present at output H00 of ROM 328. Signal 503a comprises the horizontal sync signal during active video signal, 503b is the equalizing pulses. Signal 503c comprises the vertical serrations, while signal 503d is the horizontal sync during the vertical blanking interval. Composite blanking signals 504a, 504b, 504c, and 504d are present during intervals type 0 to type 3 respectively at output H01. Signal 504a is the horizontal blanking during horizontal retrace, while signals 504b, 504c, and 504d are the blanking during the vertical blanking interval, i.e., there is blanking during the entire horizontal scan as indicated by logic "0" throughout the scan. Horizontal drive signal 505 is present during intervals type 0 to type 3 respectively at output H02 and is the same for all interval types.

A horizontal reset signal 506 is shown, which is the same for all half line intervals, and it is present at output H03. The occurrence of the pulse therein is under the control of ROM 328, and the address or addresses at which it occurs can be changed in accordance with the desired standard to be generated and the clock frequency which is desired. In addition, if for a given standard, a higher resolution or accuracy is desired, a higher frequency clock signal at input 322 is required. This, in turn, requires a different place in ROM 328 in order for reset signal 506 to occur at the same time at the beginning of every half line.

All of the above-described signals generated by ROM 328 are present at the respective ROM 328 outputs one cycle of the clock signal at 322 sooner than shown in FIG. 5. They are applied to latch 326, which reclocks them in accordance with the clock signal at input 322. This is to compensate for the delays inherent in counter 324 and ROM 328. The composite sync, composite blanking, horizontal drive, and horizontal reset signals are available for any desired system application. Typically, the composite sync and composite blanking signals are coupled to a level-shifting circuit for creating the amplitude superposition necessary to form the composite sync and blanking waveform of FIG. 1. This corresponds functionally to the D-to-A converter 218 of FIG. 2.

Counter 324 is a seven stage counter capable of 128 counts, but in the described embodiment is reset at the occurrence of the sixty-fifth count by the horizontal reset pulse 506. This occurs twice during each horizontal line.

The embodiment of FIG. 2 was constructed using integrated circuits as follows:

| Block | Quantity | Component No. | Manufacturer |
| --- | --- | --- | --- |
| 324 | 1 | 74LS393 | Texas Instruments |
| 332 | 1 | CD4040 | RCA Corporation |
| 336,326,334 | 4 each | 74LS175 | Texas Instruments |
| 328,338 | 2 each | 2758 | Intel |

Other embodiments of the invention will be apparent to those skilled in the art. For example, the clock pulses may be at the 4×SC rate or at any desired rate so long as logic of commensurate speed is used. Where gross change in synchronizing standard is contemplated, the number of stages in horizontal counter 324 and vertical counter 332 may be increased to accommodate large numbers of samples per line or large numbers of lines per field. Synchronizing and blanking signals other than those shown may be generated, as for example, pulses identifying particular lines in interval t4-t5 for identifying ancillary information.

What is claimed is:

1. A television synchronizing signal generator comprising:

memory means for storing information relating to the magnitude of at least one component of a composite synchronizing signal at each of a predetermined plurality of sampling points in each television frame; and clock signal generating means coupled to said memory means for generating periodic sampling signals for recurrently addressing said memory means for reading said information from said memory for generating said component.

2. A television synchronizing signal generator according to claim 1 wherein said component comprises horizontal synchronizing information.

3. A television synchronizing signal generator according to claim 1 wherein said component comprises vertical synchronizing information.

4. A television synchronizing signal generator according to claim 1 wherein said component comprises blanking information.

5. A television synchronization generator according to claim 1 wherein said composite synchronization signal comprises composite horizontal and vertical synchronization signals and composite blanking signal components.

6. A television synchronization generator according to claim 1 wherein said memory means comprises horizontal and vertical memories, and said generating means comprises cascaded horizontal and vertical counters coupled to said horizontal and vertical memories respectively.

7. A television synchronization signal generator according to claim 6 further comprising horizontal and vertical latches coupled to said horizontal and vertical memories respectively.

8. A television synchronization signal generator according to claim 6 wherein said horizontal and vertical memories provide reset signals to said horizontal and vertical counters respectively.

9. A television synchronization signal generator according to claim 6 wherein said vertical memory provides at least one page address signal to said horizontal memory.

10. A television synchronization generator according to claim 9 wherein said page address signal is two in number whereby four types of time intervals can be determined within said horizontal memory.

11. A television synchronization generator according to claim 6 further comprising a further counter coupled to between the output of said horizontal counter and said horizontal memory to determine half-line intervals.

12. A television apparatus adapted for ready conversion among various television standards comprising:
memory means for storing information relating to the magnitude of at least one component of a composite synchronizing signal at each of a predetermined plurality of sampling points in each television frame; and clock signal generating means coupled to said memory means for generating periodic sampling signals for recurrently addressing said memory means for reading said information from said memory for generating said component.

* * * * *

Disclaimer 4,316,219.—*Terrence R. Smith,* Mapleshade and *Frank J. Marlowe,* Kingston, N.J. SYNCHRONIZING CIRCUIT ADAPTABLE FOR VARIOUS TV STANDARDS. Patent dated Feb. 16, 1982. Disclaimer filed Mar. 19, 1986, by the assignee, *RCA Corp.*

Hereby enters this disclaimer to claims 1-5 and 12 of said patent.
[*Official Gazette May 27, 1986.*]